United States Patent
Yuan et al.

(10) Patent No.: US 11,995,400 B2
(45) Date of Patent: May 28, 2024

(54) RAPID LANGUAGE DETECTION FOR CHARACTERS IN IMAGES OF DOCUMENTS

(71) Applicant: International Business Machines Corporation, Armonk, NY (US)

(72) Inventors: Zhong Fang Yuan, Xi'an (CN); Tong Liu, Xi'an (CN); Li Juan Gao, Xi'an (CN); Xiang Yu Yang, Xi'an (CN); Qiang He, Ningbo (CN); Yu Pan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 17/468,474

(22) Filed: Sep. 7, 2021

(65) Prior Publication Data
US 2023/0073932 A1 Mar. 9, 2023

(51) Int. Cl.
*G06F 40/279* (2020.01)
*G06N 3/08* (2023.01)
(Continued)

(52) U.S. Cl.
CPC .............. *G06F 40/279* (2020.01); *G06N 3/08* (2013.01); *G06N 20/10* (2019.01); *G06V 30/41* (2022.01); *G06V 30/19* (2022.01)

(58) Field of Classification Search
CPC ....... G06F 40/279; G06F 40/263; G06N 3/08; G06N 20/10; G06N 3/0442; G06V 30/41; G06V 30/19; G06V 30/30; G06V 30/413
See application file for complete search history.

(56) References Cited

U.S. PATENT DOCUMENTS 6,370,269 B1 4/2002 Al-Karmi et al.
8,233,726 B1 * 7/2012 Popat ................. G06V 30/2445
382/187

(Continued)

FOREIGN PATENT DOCUMENTS

CN 106528535 B 4/2019

OTHER PUBLICATIONS

Understanding LSTM—a tutorial into Long Short Term Memory Recurrent Neural Networks, Sep. 23, 2019, https://www.researchgate.net/publication/335975993_Understanding_LSTM_--a_tutorial_into_Long_Short-Term_Memory_Recurrent_Neural_Networks, pp. 1-42 (Year: 2019).*

(Continued)

*Primary Examiner* — Linda Wong
(74) *Attorney, Agent, or Firm* — Zilka-Kotab, P.C.

(57) ABSTRACT

A computer-implemented method, according to one embodiment, includes: receiving an image having characters that correspond to a language, and using a text recognition algorithm to determine a first language believed to correspond to the characters. A first confidence level associated with the first language is also computed, and a determination is made as to whether the first confidence level associated with the first language is outside a predetermined range. In response to determining that the first confidence level associated with the first language is not outside the predetermined range, the first language is output as the given language. The text recognition algorithm is trained using a simple shallow neural network and a generated mixed language corpus. The generated mixed language corpus is formed by: randomly sampling libraries having vocabulary and/or characters therein, and combining the randomly sampled vocabulary and/or characters to form the generated mixed language corpus.

20 Claims, 9 Drawing Sheets

(51) Int. Cl.
*G06N 20/10* (2019.01)
*G06V 30/19* (2022.01)
*G06V 30/41* (2022.01)

(56) References Cited

U.S. PATENT DOCUMENTS

| | | |
|---|---|---|
| 2004/0006467 A1 | 1/2004 | Anisimovich et al. |
| 2013/0191111 A1* | 7/2013 | Goswami ............... G06F 40/58 |
| | | 704/8 |
| 2015/0242388 A1 | 8/2015 | Zhao et al. |
| 2016/0307033 A1 | 10/2016 | Atroshchenko et al. |

OTHER PUBLICATIONS

Lui et al., "Automatic Detection and Language Identification of Multilingual Documents," Transactions of the Association for Computational Linguistics, vol. 2, 2014, pp. 27-40.
Apple Inc., "Language Identification from Very Short Strings," Apple Inc., Machine Learning Research, Jul. 2019, 7 pages, retrieved from https://machinelearning.apple.com/research/language-identification-from-very-short-strings.

\* cited by examiner

RAPID LANGUAGE DETECTION FOR CHARACTERS IN IMAGES OF DOCUMENTS

BACKGROUND

The present invention relates to language detection, and more specifically, this invention relates to rapid language detection for characters in images of documents based on shallow neural networks and language models.

Optical character recognition (OCR) is the electronic or mechanical conversion of images having typed, handwritten, or printed text therein into machine-encoded text. Depending on the application, this conversion may involve images that are derived from a scanned document, a photo of a document, subtitle text superimposed on an image, etc. It follows that OCR is a process of digitizing printed texts so that they can be electronically edited, searched, and stored.

However, in traditional OCR text recognition scenarios involving multilingual document recognition, the conversion of different languages generally corresponds to different recognition models, each of which must have a one-to-one correspondence to be effective. For example, only English models trained in English are able to recognize English, and similarly only Chinese models trained in Chinese are able to recognize Chinese. If the wrong language model is called to convert text in an image, garbled characters will be parsed. As a result, this phenomenon causes significant inefficiencies while performing multilingual document recognition in conventional systems, as the image is processed with a number of different models until all the text is recognized. Users are typically relied on to identify which models to apply to a given multilingual document, thereby introducing additional inefficiencies.

Further still, existing language type detection can only identify text types and cannot be adapted to the scene of the scanned document. Moreover, if an image classification solution is applied, some language categories with similar fonts cannot be differentiated by existing systems, thereby further degrading achievable performance.

SUMMARY

A computer-implemented method, according to one embodiment, is for rapid language detection of documents. The computer-implemented method includes: receiving an image of a document having characters that correspond to a given language, and using a text recognition algorithm to determine a first language believed to correspond to the characters in the image of the document. A first confidence level associated with the first language believed to correspond to the characters in the image of the document is also computed, and a determination is made as to whether the first confidence level associated with the first language is outside a predetermined range. In response to determining that the first confidence level associated with the first language is not outside the predetermined range, the first language is output as the given language. It should also be noted that the text recognition algorithm is trained using a simple shallow neural network and a generated mixed language corpus. Moreover, the generated mixed language corpus is formed by: randomly sampling one or more libraries having vocabulary and/or characters therein. The randomly sampled vocabulary and/or characters from the one or more libraries are further combined to form the generated mixed language corpus.

A computer program product, according to another embodiment, is for rapid language detection of documents. The computer program product includes a computer readable storage medium having program instructions embodied therewith. Moreover, the program instructions readable and/or executable by a processor to cause the processor to: perform the foregoing method.

A system, according to yet another embodiment, includes: a processor, and logic integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
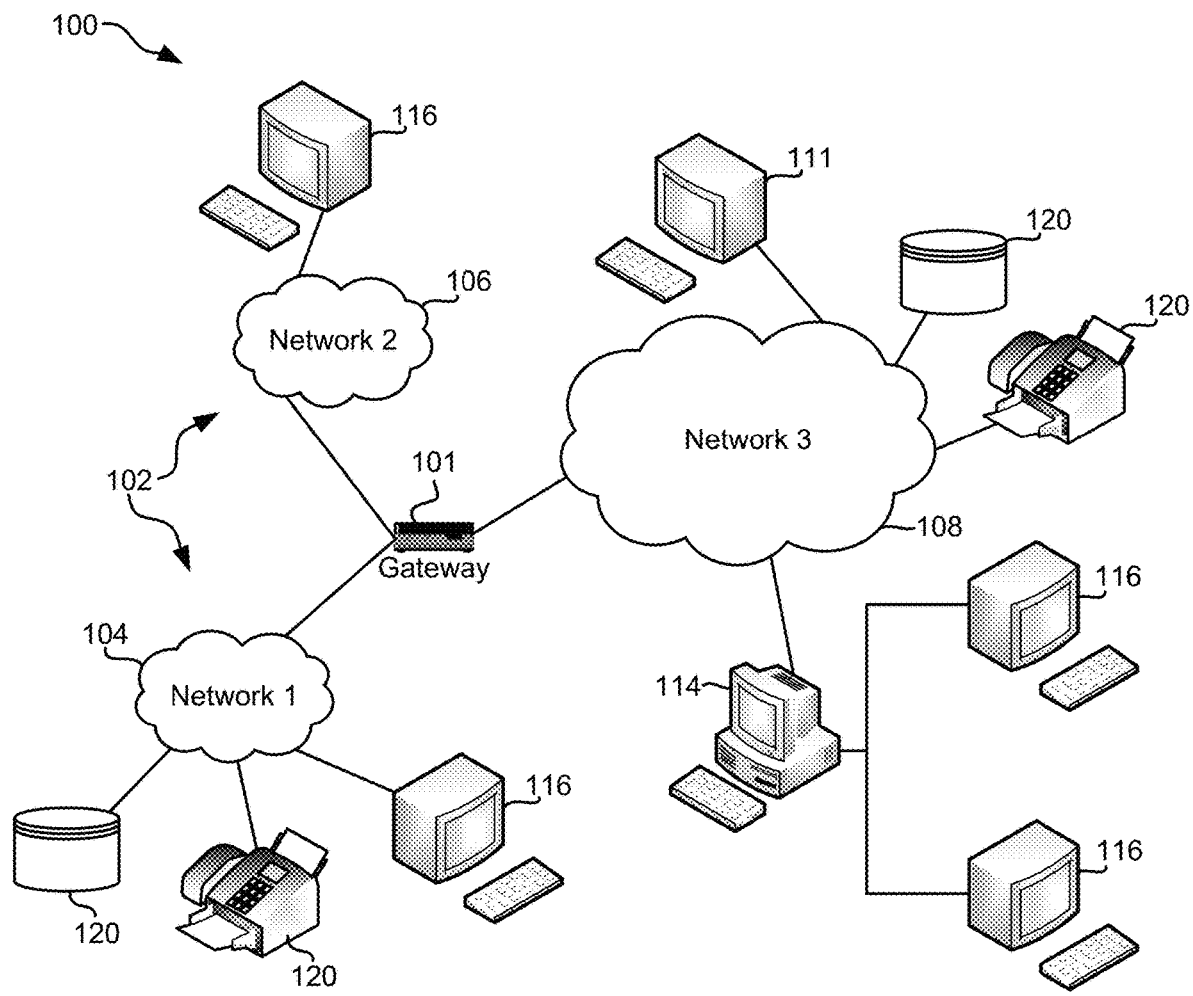
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for developing and applying models for rapid language detection of characters in images. This desirably reduces the amount of processing delay and compute resources that are consumed, thereby improving the efficiency and accuracy of the overarching system, particularly in comparison to conventional implementations. These improvements are even achieved in situations involving images having characters from multiple different languages which has previously been unachievable, e.g., as will be described in further detail below.

In one general embodiment, a computer-implemented method is for rapid language detection of documents. The computer-implemented method includes: receiving an image of a document having characters that correspond to a given language, and using a text recognition algorithm to determine a first language believed to correspond to the characters in the image of the document. A first confidence level associated with the first language believed to correspond to the characters in the image of the document is also computed, and a determination is made as to whether the first confidence level associated with the first language is outside a predetermined range. In response to determining that the first confidence level associated with the first language is not outside the predetermined range, the first language is output as the given language. It should also be noted that the text recognition algorithm is trained using a simple shallow neural network and a generated mixed language corpus. Moreover, the generated mixed language corpus is formed by: randomly sampling one or more libraries having vocabulary and/or characters therein. The randomly sampled vocabulary and/or characters from the one or more libraries are further combined to form the generated mixed language corpus.

In another general embodiment, a computer program product is for rapid language detection of documents. The computer program product includes a computer readable storage medium having program instructions embodied therewith. Moreover, the program instructions readable and/or executable by a processor to cause the processor to: perform the foregoing method.

In yet another general embodiment, a system includes: a processor, and logic integrated with the processor, executable by the processor, or integrated with and executable by the processor. Moreover, the logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to, a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
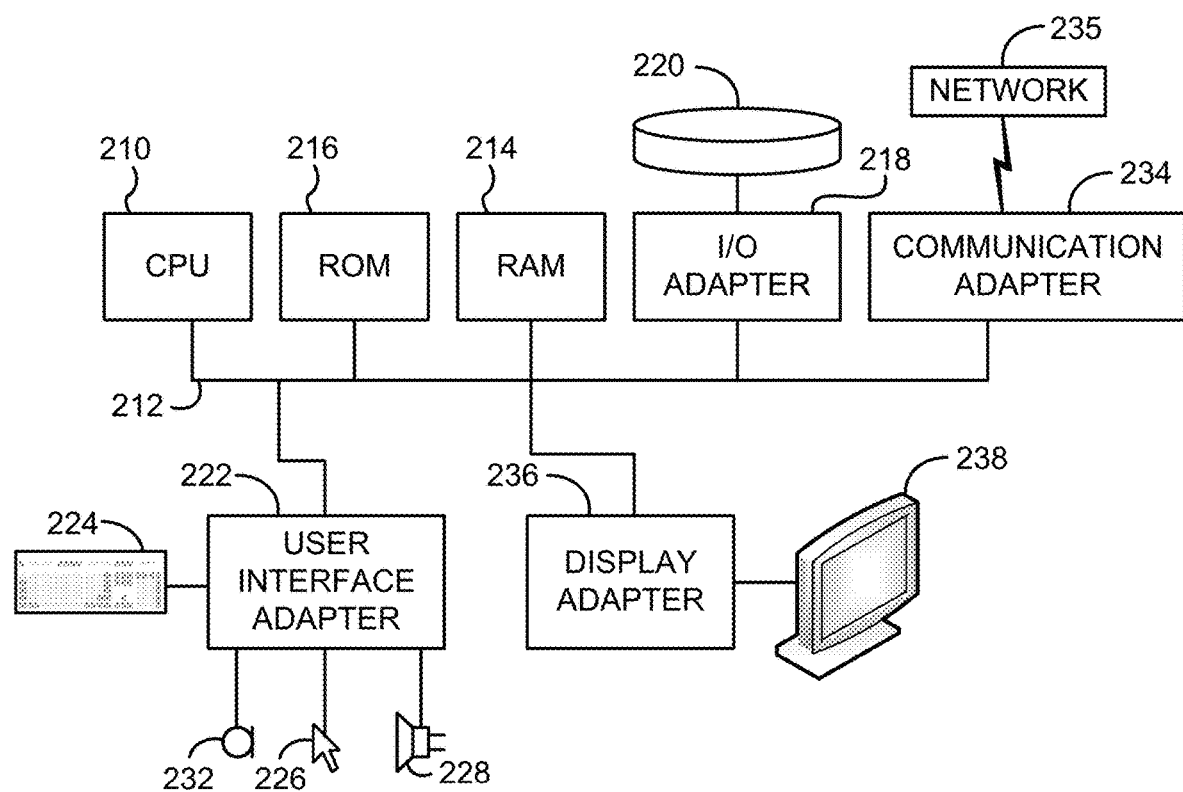
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
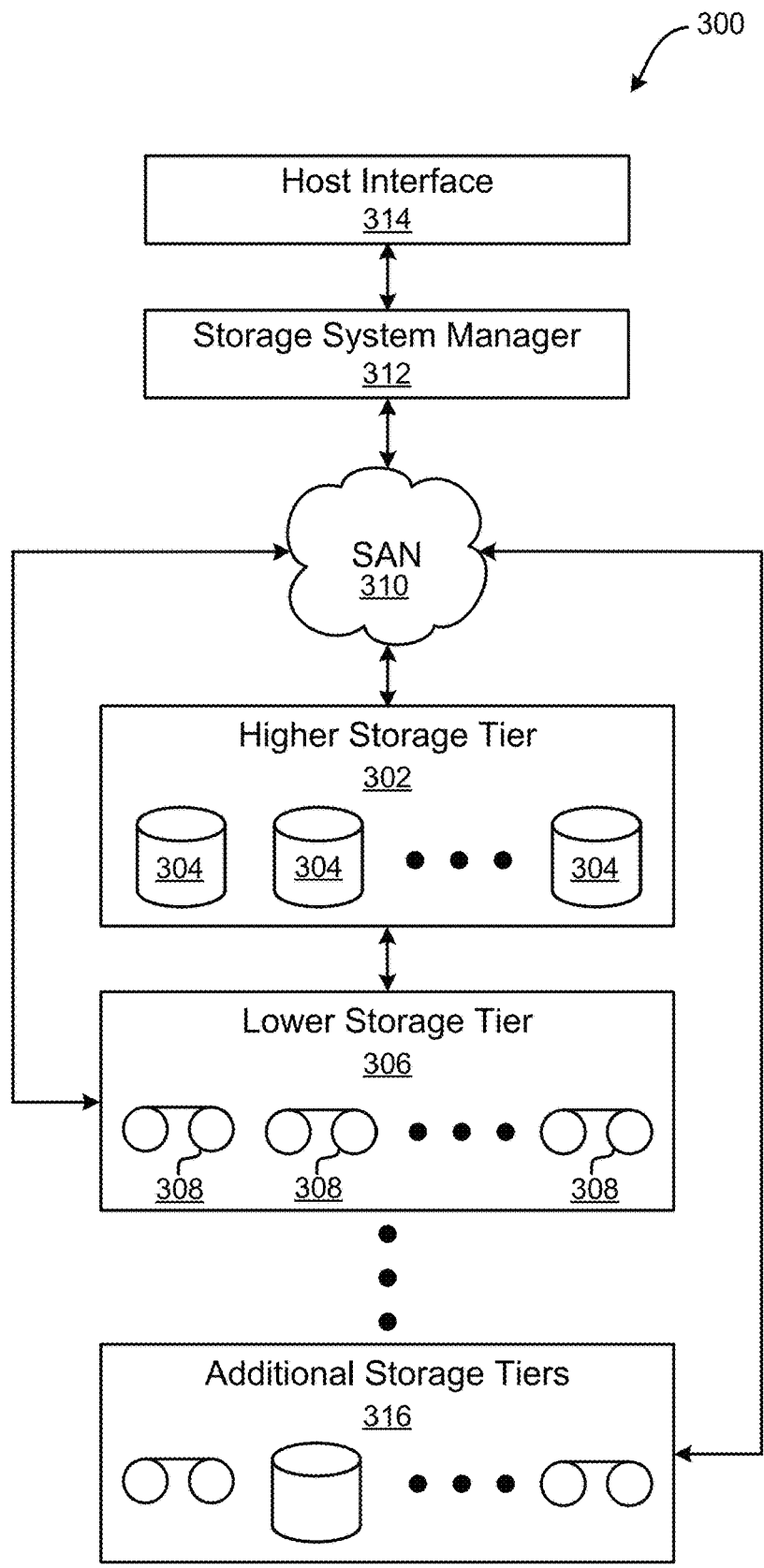
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302 may include a majority of SSD storage media for storing data in a higher performing storage environment, and remaining storage tiers, including lower storage tier 306 and additional storage tiers 316, may include any combination of SSDs, HDDs, tape drives, etc. for storing data in a lower performing storage environment. In this way, more frequently accessed data, data having a higher priority, data that are to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, OCR is the electronic or mechanical conversion of images having typed, handwritten, or printed text therein into machine-encoded text. Depending on the application, this conversion may involve images that are derived from a scanned document, a photo of a document, subtitle text superimposed on an image, etc.

However, in traditional OCR text recognition scenarios involving multilingual image recognition, the conversion of different languages generally corresponds to different recognition models, each of which must have a one-to-one correspondence to be effective. For example, only English models trained in English are able to recognize English, and similarly only Chinese models trained in Chinese are able to recognize Chinese. If the wrong language model is called to convert text in an image, garbled characters will be parsed. As a result, this phenomenon causes significant inefficiencies while performing multilingual image recognition in conventional systems, as the image is processed with a number of different models until all the text is recognized. Users are typically relied on to identify which models to apply to a given multilingual image, thereby introducing additional inefficiencies.

Further still, existing language type detection can only identify text types and cannot be adapted to the scene of the scanned image. Moreover, if an image classification solution is applied, some language categories with similar fonts cannot be differentiated by existing systems, thereby further degrading achievable performance.

In sharp contrast to these shortcomings experienced by conventional implementations, various ones of the embodiments included herein are able to develop and apply a lightweight OCR model in combination with a language model process by utilizing full language character training. As a result, text in images corresponding to multiple different languages can be efficiently and accurately identified regardless of the fonts used. This allows for images to be processed much more quickly than previously achievable while also ensuring accurate language identification and text recognition, e.g., as will be described in further detail below.

Figure 4A:
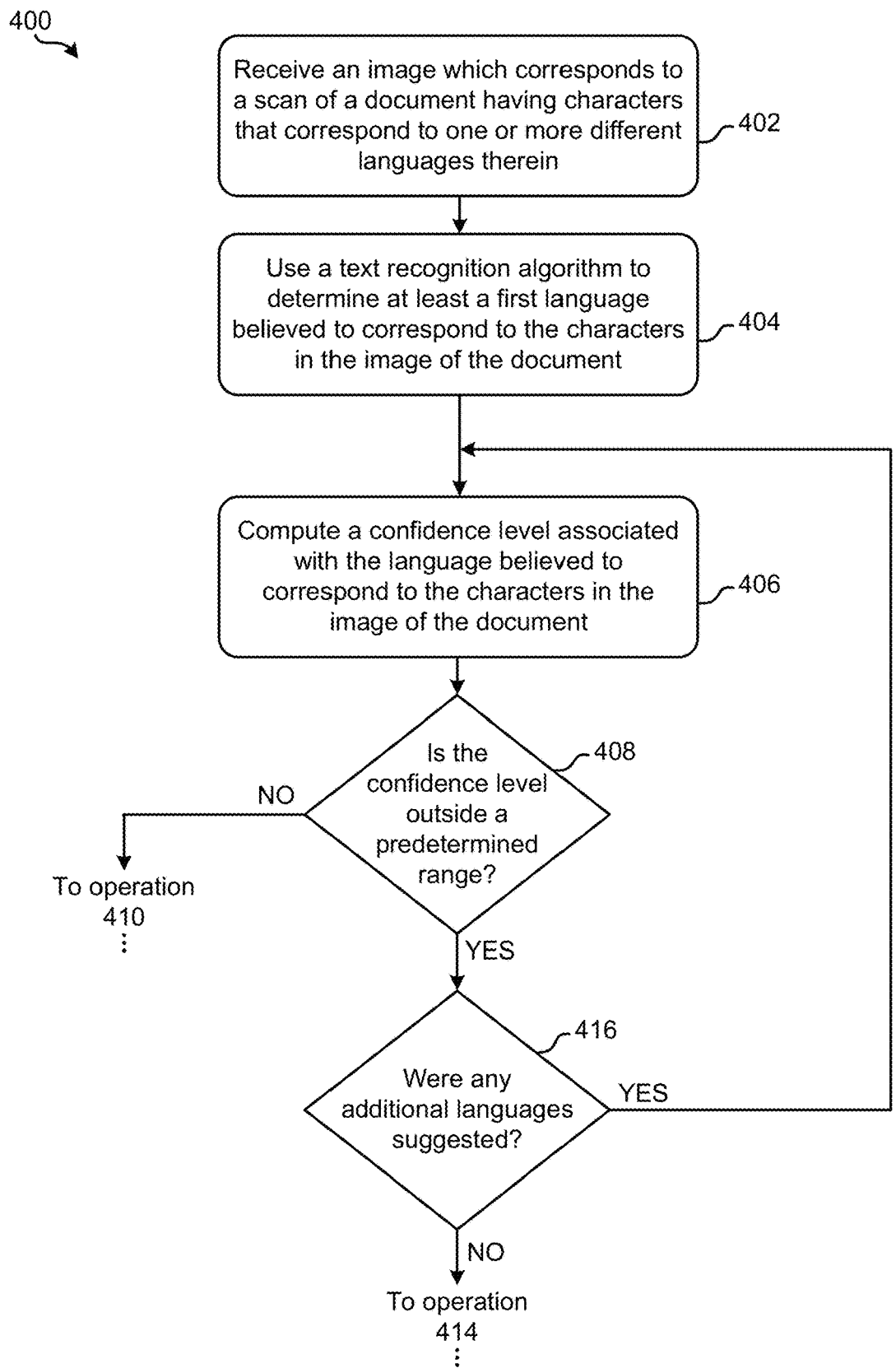
FIG. 4A is a flowchart of a method, in accordance with one embodiment.
Figure 4A:
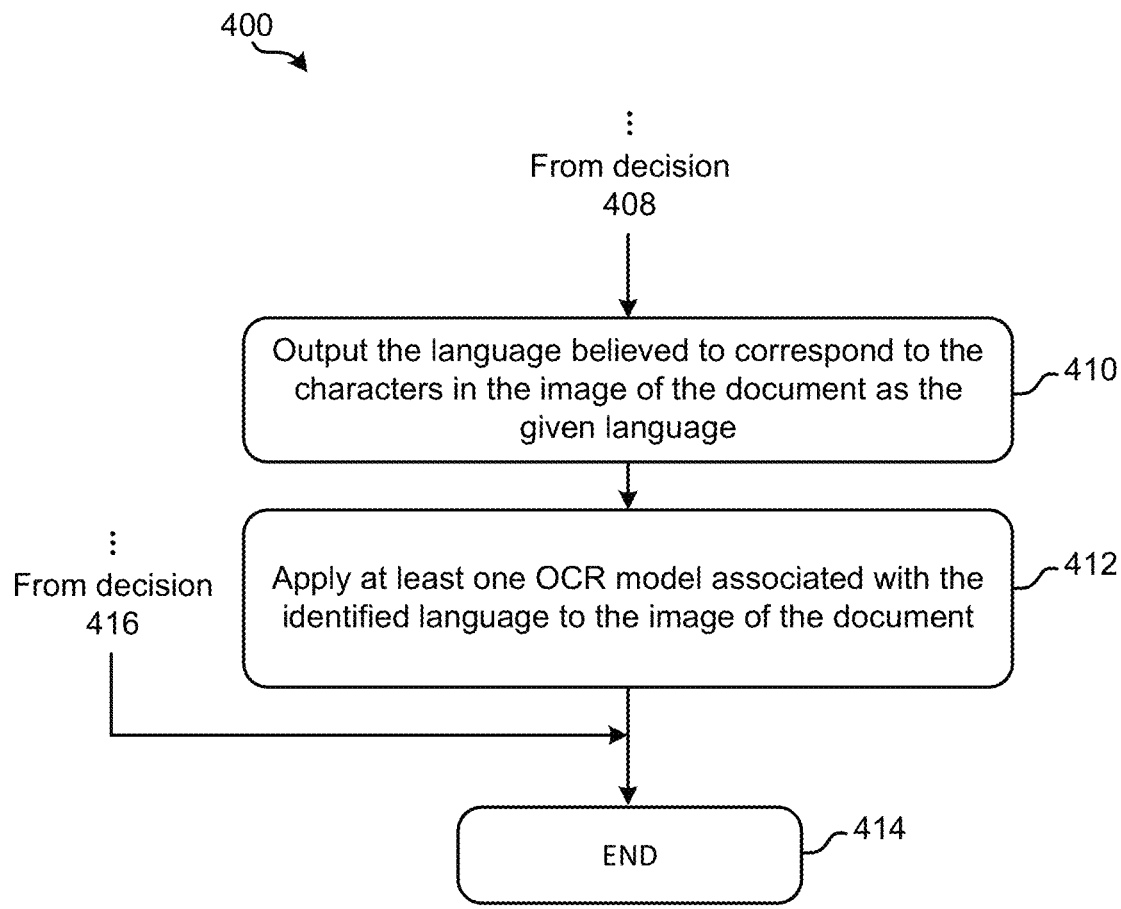

Looking now to FIG. 4A, a flowchart of a method 400 for rapid language detection of scanned documents is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, one or more of the processes included in method 400 may be performed by a central language processing controller. In various other embodiments, the method 400 may be partially or entirely performed by a controller, a processor, a computer, etc., or some other device having one or more processors therein. Thus, in some embodiments, method 400 may be a computer-implemented method. Moreover, the terms computer, processor and controller may be used interchangeably with regards to any of the embodiments herein, such components being considered equivalents in the many various permutations of the present invention.

For those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, operation 402 of method 400 includes receiving an image of a document having characters that correspond to one or more different languages. In other words, operation 402 includes receiving an image which corresponds to a scan of a document having characters that correspond to one or more different languages therein. In some approaches, the image may be received with instructions (e.g., an operational request) that request the characters (e.g., text) in the image be recognized and converted into machine-encoded text. In other approaches, it may be inherent that an image sent to a central language processing controller be processed and any characters therein be converted into machine-encoded text.

Depending on the situation, the image may be received from a user, a running application, a data storage system, a cloud computing environment, etc. The image (e.g., optical scan of the document) may also be received in a number of different formats. For instance, depending on the particular approach, the image may be received in a Joint Photographic Experts Groups (JPEG) format, a RAW format, a Tagged Image File Format (TIFF) format, etc.

From operation 402, method 400 proceeds to operation 404 which includes using a text recognition algorithm to determine at least a first language believed to correspond to the characters in the image of the document. The text recognition algorithm is thereby able to identify at least one language believed to match the language of at least some of the characters in the image of the document. However, in approaches where the image of the document includes characters of more than one different language, the text recognition algorithm may actually be able to determine more than one language believed to correspond to the various characters. In some approaches, the text recognition algorithm may actually determine more than one language, each of which are believed to correspond to the characters in the image of the document with some level of certainty (e.g., probability).

It follows that in some approaches, the text recognition algorithm may identify more than one different language, each of which are believed to match the language of the characters in the image of the document with differing levels of certainty. For instance, the text recognition algorithm may identify one language believed to match the language of the characters in the image of the document with a highest level of certainty, in addition to two different languages believed to match the language of the characters in the image of the document with lower levels of certainty. According to an example, which is in no way intended to limit the invention, the text recognition algorithm may determine that the Chinese language is a closest match to the characters in an image of a document, while the Japanese and Korean languages are the next closest matches to the characters in the image of the document. The level of certainty that a given language matches characters in an image of a document may further be quantified (e.g., represented) as a relative value in some approaches, e.g., see confidence levels in operation 406 below.

With continued reference to operation 404, the text recognition algorithm is preferably trained using a simple shallow neural network and a generated mixed language training corpus. In other words, a simple shallow neural network and a generated mixed language training corpus are preferably used in order to develop the text recognition algorithm.

The simple shallow neural network used to train the text recognition algorithm may vary depending on the approach. For instance, in some approaches the simple shallow neural network is a single layer long short-term memory (LSTM). In other approaches the simple shallow neural network may be a shallow Bi-directional-LSTM (Bi-LSTM) network. In still other approaches, the simple shallow neural network may be a linear classifier, e.g., such as a support vector machine. It follows that any desired type of simple shallow neural network may be used to actually train the text recognition algorithm using the generated mixed language training corpus.

Figure 4B:
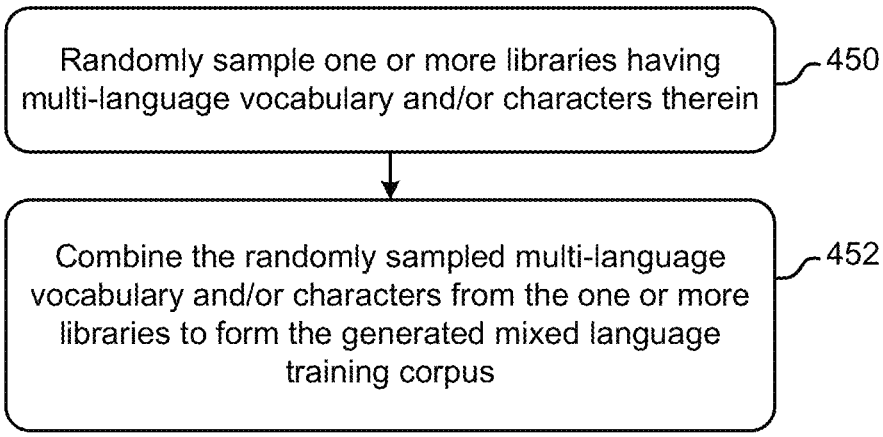
FIG. 4B is a flowchart of a method, in accordance with one embodiment.
Figure 4C:
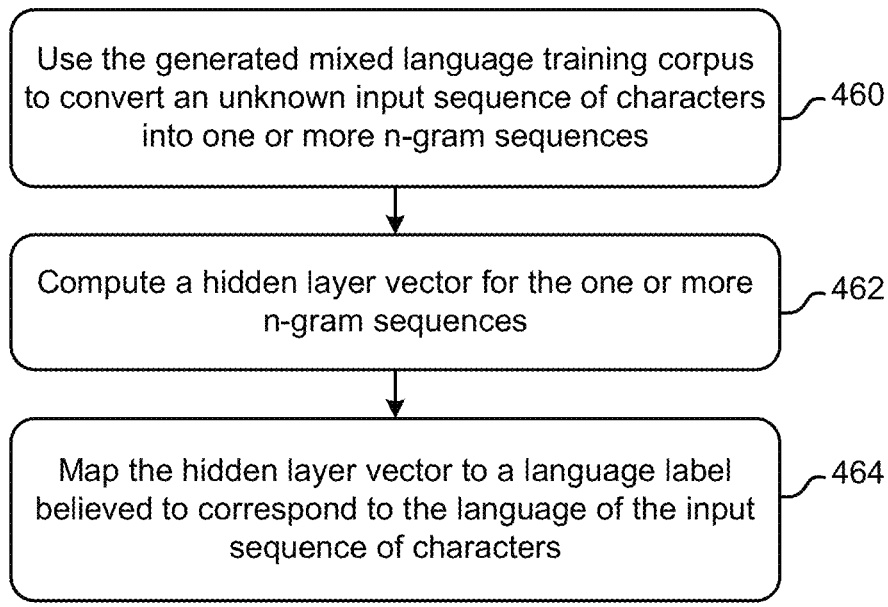
FIG. 4C is a flowchart of a method, in accordance with one embodiment.

Referring momentarily now to FIG. 4B, exemplary sub-processes of generating a mixed language training corpus are illustrated in accordance with one embodiment. Similarly, FIG. 4C illustrates exemplary sub-processes of using a text recognition algorithm to determine a first language believed to correspond to the characters in an image of a document. It follows that one or more of the sub-processes included in the flowchart of FIG. 4B and/or FIG. 4C may effectively be used in order to perform at least a portion of operation 404 of FIG. 4A. However, it should be noted that the sub-processes of FIG. 4B and the sub-processes of FIG. 4C are illustrated in accordance with one embodiment which is in no way intended to limit the invention.

Looking first to FIG. 4B, the process of generating a mixed language training corpus includes randomly sampling one or more libraries having vocabulary and/or characters therein. See sub-operation 450. The vocabulary and/or characters in each of the respective libraries that are sampled may correspond to a particular language. In other words, one of the libraries sampled may include vocabulary and/or characters therein that correspond to the Chinese language, while another one of the libraries sampled may include vocabulary and/or characters that correspond to the English language. It follows that by randomly sampling vocabulary and/or characters from libraries that each correspond to a different language, a mixed language training corpus may be formed, e.g., as will be described in further detail below. It should also be noted that with respect to the present description, "vocabulary" and "characters" are intended to refer to visual representations of words and thereby may correspond to any desired language, reporting standard, letters, alphabets, etc.

In some approaches, the libraries having vocabulary and/or characters therein may be maintained for training purposes and thereby accessed by sending one or more instructions (e.g., requests) to existing libraries. In other approaches, various libraries may be queried and those determined as being available and containing vocabulary and/or characters therein may actually be sampled. It should also be noted that with respect to the present description, a given library may be "sampled" by randomly inspecting the entries therein and requesting a copy of at least desired ones of the entries. In other words, a library may be sampled in some approaches by actually requesting and receiving a copy of at least some of the vocabulary and/or characters therein.

Entries in the libraries may also be randomly sampled because semantic coherence of the resulting mixed language training corpus is not needed. In fact, in most approaches the mixed language training corpus generated as a result of performing at least some of the sub-processes in FIGS. 4B-4C does not have the semantic coherence typically involved with Connectionist Temporal Classification (CTC) training. In other words, a proviso may be established that the generated mixed language corpus does not have semantic coherence.

The mixed language training corpus is preferably used to achieve rapid language detection for scanned documents and therefore aspects such as semantic coherence and grammatical coherence do not play a role in interpreting the characters in the image of a document and identifying the language(s) that correspond thereto. This desirably reduces the amount of time and computing resources consumed in order to form the mixed language training corpus. However, it should be noted that when randomly sampling, it is preferred that the languages in each piece of training data being sampled belong to a same language type. This allows for the sampling process to easily identify which language the training data corresponds to despite the sampling randomness, as well as increasing the achievable network convergence speed. Additionally, ensuring each piece of training data being sampled belong to a same language type avoids issues that may otherwise be caused by catastrophic interference, e.g., as would be appreciated by one skilled in the art after reading the present description.

Furthermore, sub-operation 452 in FIG. 4B includes combining the randomly sampled vocabulary and/or characters from the one or more libraries to form the generated mixed language training corpus. The randomly sampled vocabulary and/or characters may be combined in any desired manner. For instance, a copy of the randomly sampled vocabulary and/or characters may be sent to a write buffer before actually being stored in memory to form the mixed language training corpus. Moreover, the randomly sampled vocabulary and/or characters may be organized based on the corresponding languages such that the mixed language training corpus generated may be easily useable based on a desired language. The generated mixed language training corpus may also be stored in memory that is coupled to a central language processing controller being used to perform the sub-operations of FIG. 4B in some approaches, while in other approaches, the generated mixed language training corpus may be stored at a central, easily accessible location, e.g., such as memory in a cloud computing environment.

It follows that the sub-processes included in FIG. 4B may be used to actually generate a mixed language training corpus. Depending on the approach, the sub-processes included in FIG. 4B may be performed once to generate a mixed language training corpus, while in other approaches one or more of the sub-processes included in FIG. 4B may be repeated any desired number of times. Accordingly, the generated mixed language training corpus may continually be added to (e.g., in the background) to improve the accuracy and effectiveness by which the text recognition algorithm may be trained, e.g., as will soon become apparent.

Referring now to FIG. 4C, the process of actually using a trained text recognition algorithm to determine a first language believed to correspond to the characters in an image of a document is illustrated in accordance with one embodiment. In some approaches, the text recognition algorithm may be utilized along with natural language processing technology to detect the language type that corresponds to a string of characters. In some approaches, an n-gram classification model may be implemented as the language model. Accordingly, sub-operation 460 includes using the generated mixed language training corpus to convert an unknown input sequence of characters into one or more n-gram sequences.

With respect to the present description, the "input sequence" may include any desired amount of the characters in an image of a document and/or words included in the generated mixed language training corpus. It follows that the generated mixed language training corpus may serve as a language dictionary. Again, aspects such as semantic coherence and grammatical coherence do not play a role in interpreting the characters in the image of a document and identifying the language(s) that correspond thereto. Accordingly, the entries in the mixed language training corpus may be in the smallest possible semantic units of their corresponding languages, e.g., such as words. It follows that based on this mixed language training corpus, the input sequence text can be converted into an n-gram sequence, and the n-gram sequence may be used as a string index. The input sequence may thereby simply be a random string of words that are in a same language.

Each of the n-gram vectors (e.g., string indexes) in the text to be predicted may further be used to compute a hidden layer vector. Sub-operation 462 thereby further includes computing a hidden layer vector for the one or more n-gram sequences. According to some approaches, a hidden layer vector may be computed for one or more n-gram sequences used as string indexes by calculating the sum and average of the n-gram sequences.

Furthermore, sub-operation 464 includes mapping the hidden layer vector to a language label. In other words, sub-operation 464 includes mapping the hidden layer vector computed in sub-operation 462 to a language label believed to correspond to the language of the input sequence of characters. According to some approaches, the hidden layer vector is mapped to the final language label through a softmax layer, e.g., as would be appreciated by one skilled in the art after reading the present description. Thus, the hidden layer vector may be mapped to a language label with a relative probability distribution associated with the given label. This relative probability distribution may assist in the continued training of the text recognition algorithm and may even serve as proof that the algorithm was properly (e.g., adequately) calibrated during training.

It follows that the sub-processes included in FIG. 4C are able to utilize the text recognition algorithm to efficiently identify one or more languages that are believed to correspond to unknown characters in the image (e.g., scan) of a document. The efficiency by which languages may be identified using the approaches herein is also irrespective of the quality of the mixed language training corpus. As noted above, aspects such as semantic coherence and grammatical coherence do not play a role in interpreting the characters in the image of a document and identifying the language(s) that correspond thereto. Accordingly, the entries in the mixed language training corpus may be in the smallest possible semantic units of their corresponding languages, e.g., such as words. However, in other approaches the mixed language training corpus may actually incorporate aspects such as semantic coherence and grammatical coherence.

But even if the recognized characters have many errors in terms of the grammar, sentence structure, semantics, etc., by identifying the appropriate language which corresponds to the characters, these low-quality recognition results may be used in combination with natural language processing algorithms. Moreover, because a simple shallow neural network is used while training the text recognition algorithm, the resources and time consumed to form this language type detection is negligible compared to those consumed by conventional implementations.

Referring again now to FIG. 4A, it follows that method 400 is able to utilize a simple shallow neural network and a generated mixed language training corpus to develop a text recognition algorithm. The text recognition algorithm may further be used to determine a language believed to correspond to the characters in an image of a document as described above, e.g., see operation 404. However, it should be noted that although operation 404 includes using the text recognition algorithm to determine a first language believed to correspond to the characters in the image of the document, it is again noted that in some approaches, the text recognition algorithm may actually determine more than one language, each of which are believed to correspond to the characters in the image of the document with some level of certainty (e.g., probability). Accordingly, in some approaches the text recognition algorithm may produce the top "N" languages believed to correspond to characters in an image, as well as the probability associated with each of the "N" languages actually corresponding to at least a portion of the characters in the image (e.g., see FIG. 5C below).

Operation 406 of method 400 includes computing a confidence level associated with the first language believed to correspond to the characters in the image of the document. In some approaches, the confidence level associated with a given language believed to correspond to characters in an image may be determined by calculating an average confidence score (e.g., confidence level) for the entire document. In other words, a score representing the confidence with which the given language matches all characters in the image of the document may be used to gauge the accuracy of the identified language. The confidence level may be calculated using any processes which would be apparent to one skilled in the art after reading the present description. For example, a confidence level for a given language may be calculated by determining a weighted probability for the entire document.

For approaches in which the top "N" languages believed to correspond to characters in an image are produced, a confidence level (e.g., score) is preferably computed for each of the "N" languages. The "N" different languages may thereby be processed in an order that corresponds to the relative confidence levels. For example, a language having a highest confidence level may be processed first and each of the remaining languages may be processed in an order of descending confidence levels. In other situations, the produced languages may be processed in an order of ascending confidence levels, randomly, based on user input, etc.

Proceeding to decision 408, a determination is made as to whether the first confidence level associated with the first language is outside a predetermined range. In other words, decision 408 includes determining whether the first language believed to correspond to the characters in the image of the document is a sufficiently close match to the actual language of the characters in the image. Accordingly, it should be noted that "outside a predetermined range" is in no way intended to limit the invention. Rather than determining whether a value is outside a predetermined range, equivalent determinations may be made, e.g., as to whether a value is within a predetermined range, whether a value is above a threshold, whether an absolute value is above a threshold, whether a value is below a threshold, etc., depending on the desired approach. Moreover, the range may be predetermined by a user, an administrator, based on industry standards, etc.

In response to determining that the first confidence level associated with the first language is not outside the predetermined range, method 400 proceeds directly to operation 410. There, operation 410 includes outputting the first language believed to correspond to the characters in the image of the document as the given language. It follows that in response to determining that the language predicted to correspond to the characters in the image of the document is sufficiently accurate, the predicted language may be identified as the actual language of the characters.

However, it should be noted that in some approaches a language determined to correspond to the characters in the image of the document may be submitted for review in some instances. For example, although not depicted in FIG. 4A, method 400 may include submitting the language determined to correspond to the characters in the image of the document for review, e.g., by a human. The human that reviews the identified language is preferably able to determine whether characters in the image of the document correspond to a variety of different languages. Accordingly, in preferred approaches the human is an expert in linguistic evaluation. In response to determining that the review reveals the identified language does not actually correspond to the characters in the image of the document, method 400 may return to operation 406 such that the characters can be evaluated with respect to another language, e.g., as will be described in further detail below.

Once the language of the characters in an image has been identified to a desired accuracy, additional OCR processing may be performed on the image. In other words, once the various processes in method 400 have successfully identified a language which corresponds to the characters in a given image, OCR models associated with the identified language may be used to further process the characters in the image and actually form machine-encoded text. Accordingly, operation 412 further includes applying at least one OCR model associated with the identified language to the image of the document.

The machine-encoded text formed by the OCR model(s) may be stored in memory, returned to a requesting entity, used in a running application, etc. depending on the particular approach. Accordingly, from operation 412, the flowchart proceeds to operation 414 whereby method 400 may end. However, it should be noted that although method 400 may end upon reaching operation 414, any one or more of the processes included in method 400 may be repeated in order to process additional images of documents. In other words, any one or more of the processes included in method 400 may be repeated to identify the one or more languages in the image of a document.

Returning now to decision 408, in some situations a language believed to correspond to the characters in the image of a document may not actually be an accurate match. In other words, the characters may not actually correspond to the identified language. In other situations, even if the identified language does correspond to some of the characters in the image of the document, the document itself may be a multilingual document having characters that correspond to two or more different languages.

However, as noted above, in some approaches the text recognition algorithm may actually determine more than one language, each of which are believed to correspond to the characters in the image of a document with some level of certainty (e.g., probability). Accordingly, in some approaches the text recognition algorithm may produce the top "N" languages believed to correspond to characters in an image, as well as the probability associated with each of the "N" languages actually corresponding to at least a portion of the characters in the image.

Accordingly, from decision 408, method 400 proceeds to decision 416. There, decision 416 includes determining whether any additional languages were suggested as corresponding to the characters in the image of a document. In response to determining that no additional languages were suggested as corresponding to the characters in the image of a document, the flowchart proceeds directly to operation 414 whereby method 400 may end as noted above. However, in some approaches an error may be sent in response to not identifying a language that adequately matches the characters in the image of the document being evaluated. In other approaches the image of the document may be reprocessed in an attempt to identify a matching language.

However, in response to determining that at least one additional language was suggested as corresponding to the characters in the image of a document, at least some of the foregoing processes are preferably repeated for another one of the suggested languages. Accordingly, the flowchart returns to operation 406 from decision 416 in response to determining that at least one additional language was suggested as corresponding to the characters in the image of a document. There, operation 406 may be repeated such that another confidence level is computed for a subsequent one of the suggested languages believed to correspond to the characters in the image of the document. Moreover, the confidence level may be computed using any one or more of the approaches described above.

From operation 406, method 400 proceeds to decision 408 such that a determination can be made as to whether the newly computed confidence level associated with the subsequent one of the suggested languages is outside the predetermined range. It follows that processes 406, 408, and 416 may be repeated any desired number of times, e.g., in an iterative fashion for each of the languages determined in operation 404 as potentially corresponding to the characters in the image of the document.

For example, processes 406, 408, and 416 may be repeated such that a second confidence level associated with a second language believed to correspond to the characters in the image of the document is computed and compared to the predetermined range in response to determining that a first confidence level associated with a first language believed to correspond to the characters in the image of the document is outside the predetermined range. Furthermore, processes 406, 408, and 416 may be repeated again such that a third confidence level associated with a third language believed to correspond to the characters in the image of the document is computed and compared to the predetermined range in response to determining that the first and second confidence levels associated with the first and second languages are outside the predetermined range.

It follows that the various processes included in method 400 are able to provide rapid and accurate language detection for images (e.g., scanned documents) based on shallow neural networks. This desirably reduces the amount of processing delay and compute resources that are consumed, thereby improving the efficiency and accuracy of the overarching system, particularly in comparison to conventional implementations. These improvements are even achieved when processing images having characters from multiple different languages which has previously been unachievable.

Figure 5A:
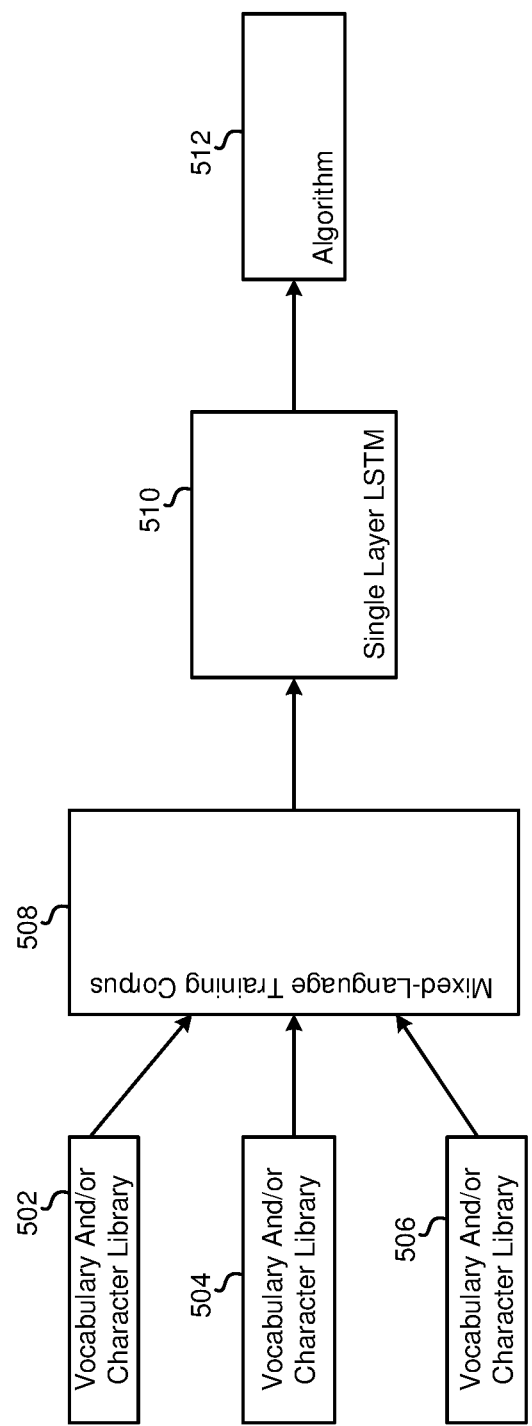
FIGS. 5A-5C are partial representational views of a process for developing and applying a model for rapid language detection of scanned documents, in accordance with an in-use example.
Figure 5B:
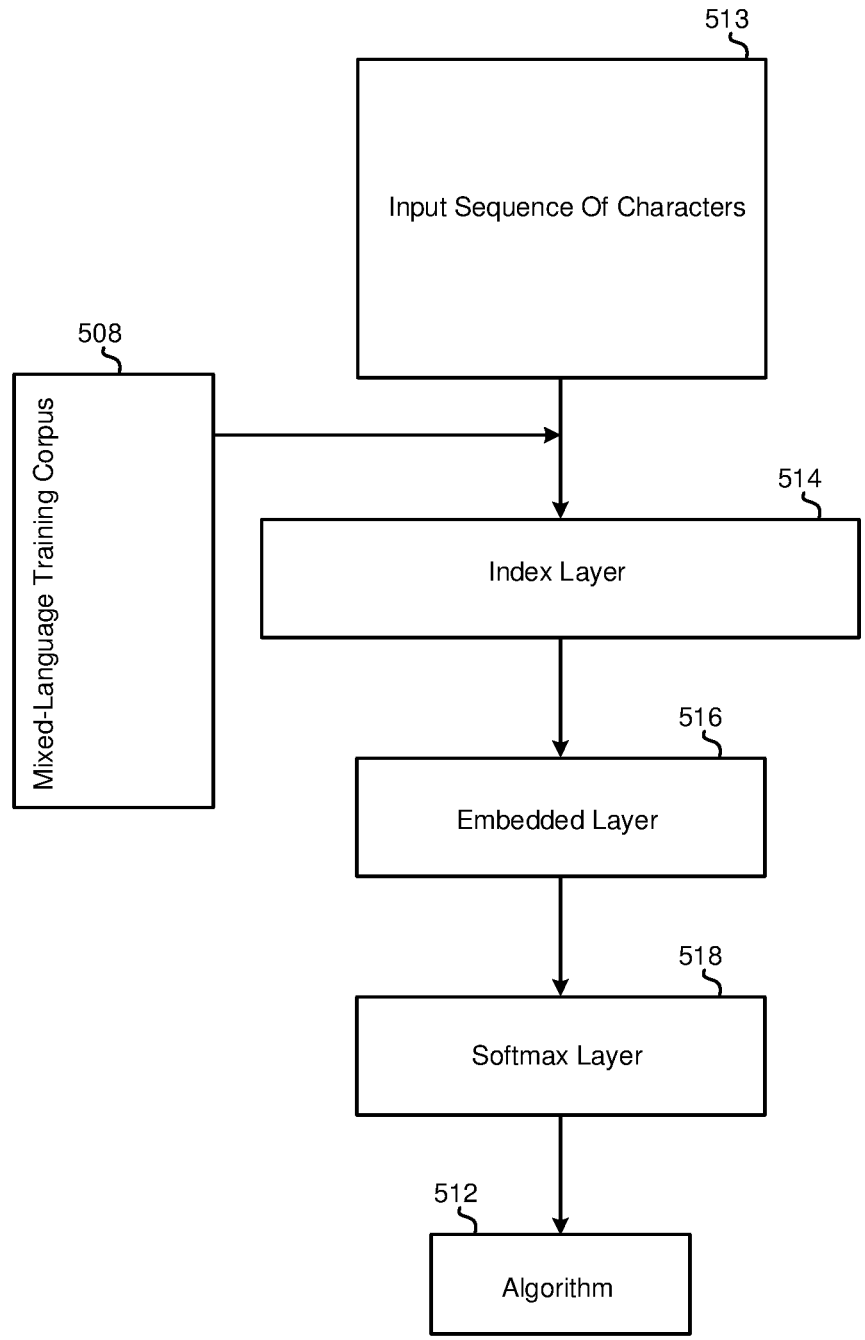
Figure 5C:
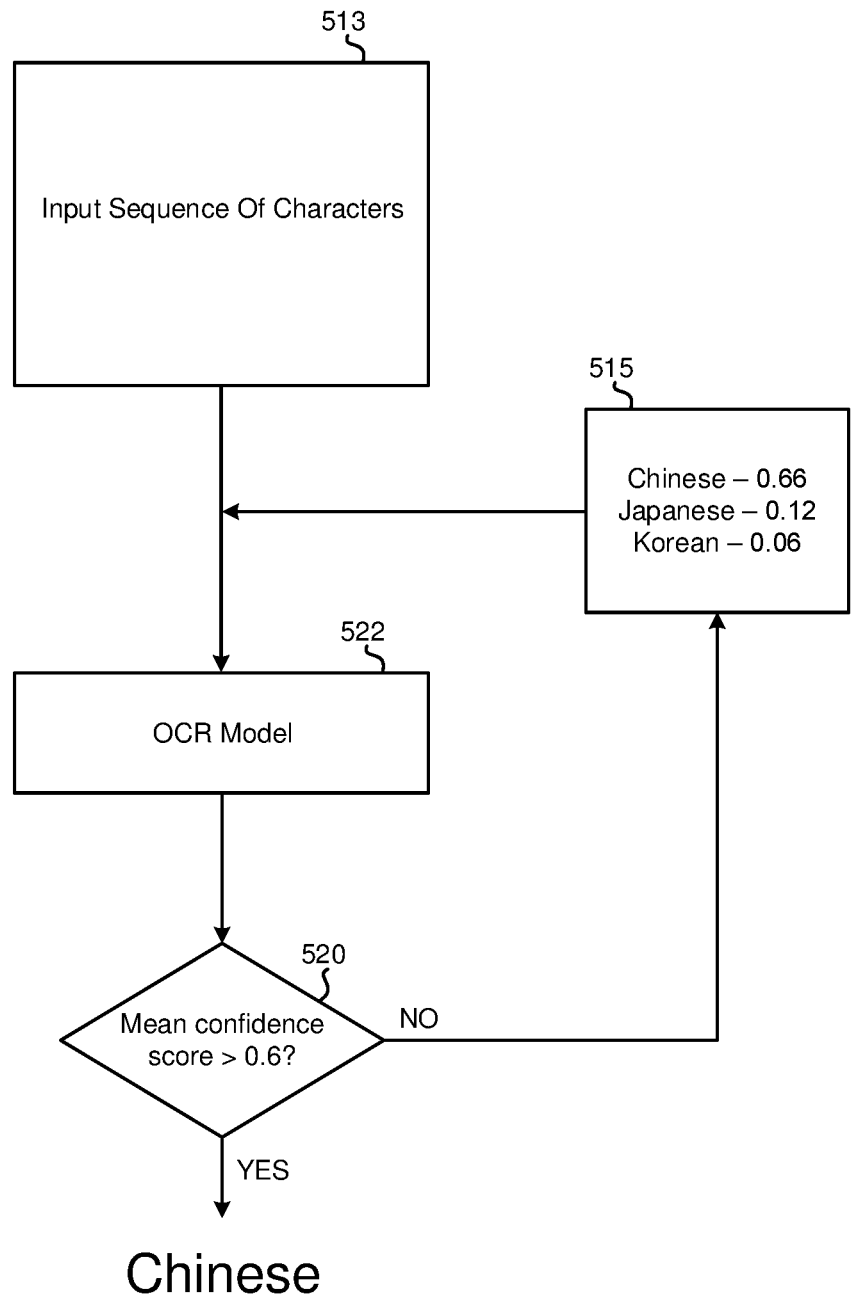

Referring now to FIGS. 5A-5C, a process of developing and applying a model for rapid language detection of scanned documents is illustrated in accordance with an in-use example which is in no way intended to limit the invention. Looking specifically to FIG. 5A, vocabulary and/or character libraries 502, 504, 506 each correspond to a different language and are combined together to form a mixed-language training corpus 508. In some approaches, the mixed-language training corpus 508 may be formed by performing random sampling of the libraries 502, 504, 506 and combining the sampled items, e.g., as described above. For instance, each of the libraries 502, 504, 506 may include vocabulary and/or characters of a different language than the others. The libraries 502, 504, 506 themselves may also be actively managed by a user, publicly available, accessed by paying a fee, managed at a remote storage location, accessed over a network (e.g., the Internet), stored in local memory, etc., depending on the approach. It follows that the process of randomly sampling the words and/or characters in the libraries 502, 504, 506 may also vary depending on how and where the libraries 502, 504, 506 are stored.

As previously mentioned, the mixed-language training corpus 508 may not have the semantic coherence typically involved with CTC training. The mixed language training corpus is preferably used to achieve rapid language detection for scanned documents and therefore aspects such as semantic coherence and grammatical coherence do not play a role in interpreting the characters in the image of a document and identifying the language(s) that correspond thereto. Accordingly, the entries in the mixed language training corpus may be in the smallest possible semantic units of their corresponding languages, e.g., such as individual words or characters. Moreover, the individual words or characters in the mixed language training corpus may be organized such that each language is distinguishable from the others. For instance, each word or character may be stored with a small amount of metadata that identifies the language it corresponds to. In other approaches, each word or character may be stored with a flag which identifies the language the respective word or character corresponds to. Thus, even if the recognized characters have errors in terms of the grammar, sentence structure, semantics, etc., by identifying the appropriate language which corresponds to the characters, these low-quality recognition results may be used in combination with natural language processing algorithms.

The mixed-language training corpus 508 is processed using a simple shallow neural network. While the simple shallow neural network that is used to train the text recognition algorithm may vary depending on the approach, the present in-use example uses a single layer LSTM 510 to actually process the mixed-language training corpus 508 and train a text recognition algorithm. Because a simple shallow neural network is used while training the text recognition algorithm, the resources and time consumed to form this language type detection is negligible compared to those consumed by conventional implementations. As a result, the single layer LSTM 510 outputs a text recognition algorithm 512 that may be used to actually identify languages that correspond to characters in a given image.

Looking now to FIG. 5B, the text recognition algorithm 512 is used to actually analyze unknown characters in an image and determine three languages that may correspond thereto. Specifically, an unknown input sequence of characters 513 is evaluated with respect to the mixed-language training corpus 508 such that the input sequence of characters 513 is converted into an n-gram sequence. The n-gram sequence may further be used as a string index in the index layer 514. From the index layer 514, the string indexes are sent to an embedded layer 516, where each n-gram vector (string index) in the unknown text is summed and averaged as a hidden layer vector. It should also be noted that the unknown input sequence of characters 513 may be in different forms depending on the approach. For instance, in some approaches the input sequence of characters 513 may actually be an image (e.g., scan) of a document.

Furthermore, the hidden layer vector is mapped to at least one final language label through a softmax layer 518 before being returned to the text recognition algorithm 512. The text recognition algorithm 512 is thereby able to process the information and produce the top "N" candidate languages believed to correspond to a language of the original unknown input sequence of characters 513. Looking specifically to FIG. 5C, it is shown that the text recognition algorithm 512 produced the top 3 candidate languages 515 believed to correspond to a language of the original unknown input sequence of characters 513. Moreover, a confidence level associated with each of the 3 languages is also computed, where the confidence level represents a likelihood that the given language actually corresponds to the unknown input sequence of characters 513. For instance, the Chinese language has a confidence level of 0.66, while the Japanese language has a confidence level of 0.12, and the Korean language has a confidence level of 0.06. It follows that the Chinese language has a greatest likelihood of actually corresponding to the characters in the unknown input sequence of characters 513.

The confidence level associated with a given language may be determined in some approaches by actually applying an OCR model 522 that corresponds to the given language to the unknown input sequence of characters 513. In other words, the confidence score of 0.66 for the Chinese language may be determined by actually applying a Chinese OCR model to the unknown input sequence of characters 513 and quantifying the results to represent a confidence score for the Chinese language. Similar steps may be taken to determine a confidence score for the Japanese and Korean languages, respectively.

As noted above, in response to determining that a mean value of the confidence level of a given language is undesirably low in decision 520, the language may be determined as not corresponding to the unknown input sequence of characters 513. Moreover, in response to determining that one of the languages does not actually correspond to the unknown input sequence of characters 513, a next of the produced candidate languages may be evaluated in a similar or same manner.

Accordingly, if decision 520 were to determine that the confidence score for the Chinese language had been undesirably low, a next one of the proposed languages 515 (Japanese) would be evaluated and a corresponding Japanese OCR model 522 applied to the unknown input sequence of characters 513. Similarly, the Korean language would be evaluated in response to determining that the confidence score for the Japanese language was undesirably low. However, because the confidence score of the Chinese language is sufficiently high, the Chinese language is output as representing the characters in the unknown sequence 513.

Again, while images having characters of one language may be processed using one of the produced candidate languages, images having multilingual characters may be processed using more than one of the produced candidate languages. Thus, it should be noted that although various ones of the approaches described herein only identify one of the produced candidate languages, more than one language may be used in situations involving multilingual characters, e.g., as would be appreciated by one skilled in the art after reading the present description. In such approaches, the predetermined range used to evaluate the different confidence levels may be broadened, thereby potentially increasing the number of languages that are actually suggested and/or used to actually evaluate characters in an image.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for rapid language detection of documents, comprising:
   receiving an image of a document having characters that correspond to a given language;
   using a text recognition algorithm to determine a first language believed to correspond to the characters in the image of the document by:
   using a generated mixed language corpus to convert an input sequence of the characters in the image of the document into one or more n-gram sequences, and
   computing a hidden layer vector for the one or more n-gram sequences,
   wherein the text recognition algorithm is trained using a simple shallow neural network and the generated mixed language corpus,
   wherein the generated mixed language corpus is formed by:
   randomly sampling one or more libraries having vocabulary and/or characters therein, and combining the randomly sampled vocabulary and/or characters from the one or more libraries to form the generated mixed language corpus;
computing a first confidence level associated with the first language believed to correspond to the characters in the image of the document;
determining whether the first confidence level associated with the first language is outside a predetermined range; and
in response to determining that the first confidence level associated with the first language is not outside the predetermined range, outputting the first language as the given language.

2. The computer-implemented method of claim 1, wherein using a text recognition algorithm to determine a first language believed to correspond to the characters in the image of the document includes:
mapping the hidden layer vector to a language label.

3. The computer-implemented method of claim 2, wherein computing a hidden layer vector for the one or more n-gram sequences includes:
calculating an average of the n-gram sequences.

4. The computer-implemented method of claim 1, comprising:
in response to determining that the first confidence level associated with the first language is outside the predetermined range, computing a second confidence level associated with a second language believed to correspond to the characters in the image of the document;
determining whether the second confidence level associated with the second language is outside the predetermined range; and
in response to determining that the second confidence level associated with the second language is not outside the predetermined range, outputting the second language believed to correspond to the characters in the image of the document as the given language.

5. The computer-implemented method of claim 4, comprising:
in response to determining that the second confidence level associated with the second language is outside the predetermined range, computing a third confidence level associated with a third language believed to correspond to the characters in the image of the document;
determining whether the third confidence level associated with the third language is outside the predetermined range; and
in response to determining that the third confidence level associated with the third language is not outside the predetermined range, outputting the third language believed to correspond to the characters in the image of the document as the given language.

6. The computer-implemented method of claim 1, with a proviso that the generated mixed language corpus does not have semantic coherence.

7. The computer-implemented method of claim 1, wherein the simple shallow neural network is a long short-term memory (LSTM).

8. The computer-implemented method of claim 1, wherein the simple shallow neural network is a support vector machine.

9. The computer-implemented method of claim 1, comprising:
in response to outputting the first language as the given language, sending one or more instructions to apply an optical character recognition (OCR) model to the image of the document, wherein the OCR model corresponds to the first language.

10. A computer program product for rapid language detection of documents, the computer program product comprising a computer readable storage medium having program instructions embodied therewith, the program instructions readable and/or executable by a processor to cause the processor to:
receive, by the processor, an image of a document having characters that correspond to a given language;
use, by the processor, a text recognition algorithm to determine a first language believed to correspond to the characters in the image of the document by:
using a generated mixed language corpus to convert an input sequence of the characters in the image of the document into one or more n-gram sequences, and
computing a hidden layer vector for the one or more n-gram sequences,
wherein the text recognition algorithm is trained using a simple shallow neural network and the generated mixed language corpus,
wherein the generated mixed language corpus is formed by:
randomly sampling one or more libraries having vocabulary and/or characters therein, and
combining the randomly sampled vocabulary and/or characters from the one or more libraries to form the generated mixed language corpus;
compute, by the processor, a first confidence level associated with the first language believed to correspond to the characters in the image of the document;
determine, by the processor, whether the first confidence level associated with the first language is outside a predetermined range; and
in response to determining that the first confidence level associated with the first language is not outside the predetermined range, output, by the processor, the first language believed to correspond to the characters in the image of the document as the given language.

11. The computer program product of claim 10, wherein using a text recognition algorithm to determine a first language believed to correspond to the characters in the image of the document includes:
mapping the hidden layer vector to a language label.

12. The computer program product of claim 11, wherein computing a hidden layer vector for the one or more n-gram sequences includes: calculating an average of the n-gram sequences.

13. The computer program product of claim 10, wherein the program instructions are readable and/or executable by the processor to cause the processor to:
in response to determining that the first confidence level associated with the first language is outside the predetermined range, compute, by the processor, a second confidence level associated with a second language believed to correspond to the characters in the image of the document;
determine, by the processor, whether the second confidence level associated with the second language is outside the predetermined range; and
in response to determining that the second confidence level associated with the second language is not outside the predetermined range, output, by the processor, the second language believed to correspond to the characters in the image of the document as the given language.

14. The computer program product of claim 13, wherein the program instructions are readable and/or executable by the processor to cause the processor to:

in response to determining that the second confidence level associated with the second language is outside the predetermined range, compute, by the processor, a third confidence level associated with a third language believed to correspond to the characters in the image of the document;

determine, by the processor, whether the third confidence level associated with the third language is outside the predetermined range; and in response to determining that the third confidence level associated with the third language is not outside the predetermined range, output, by the processor, the third language believed to correspond to the characters in the image of the document as the given language.

15. The computer program product of claim 10, with a proviso that the generated mixed language corpus does not have semantic coherence.

16. The computer program product of claim 10, wherein the simple shallow neural network is a long short-term memory (LSTM).

17. The computer program product of claim 10, wherein the simple shallow neural network is a support vector machine.

18. A system, comprising:

a processor; and logic integrated with the processor, executable by the processor, or integrated with and executable by the processor, the logic being configured to:

receive, by the processor, an image of a document having characters that correspond to a given language;

use, by the processor, a text recognition algorithm to determine a first language believed to correspond to the characters in the image of the document by:

using a generated mixed language corpus to convert an input sequence of the characters in the image of the document into one or more n-gram sequences, and computing a hidden layer vector for the one or more n-gram sequences, wherein the text recognition algorithm is trained using a simple shallow neural network and the generated mixed language corpus, wherein the generated mixed language corpus is formed by:

randomly sampling one or more libraries having vocabulary and/or characters therein, and combining the randomly sampled vocabulary and/or characters from the one or more libraries to form the generated mixed language corpus;

compute, by the processor, a first confidence level associated with the first language believed to correspond to the characters in the image of the document;

determine, by the processor, whether the first confidence level associated with the first language is outside a predetermined range; and in response to determining that the first confidence level associated with the first language is not outside the predetermined range, output, by the processor, the first language believed to correspond to the characters in the image of the document as the given language.

19. The system of claim 18, wherein using a text recognition algorithm to determine a first language believed to correspond to the characters in the image of the document includes:

mapping the hidden layer vector to a language label, wherein computing a hidden layer vector for the one or more n-gram sequences includes: calculating an average of the n-gram sequences.

20. The system of claim 18, with a proviso that the generated mixed language corpus does not have semantic coherence, wherein the simple shallow neural network is a long short-term memory (LSTM).

\* \* \* \* \*